(12) United States Patent
Breiland

(10) Patent No.: US 8,894,475 B2
(45) Date of Patent: Nov. 25, 2014

(54) METHOD AND DEVICE FOR EXTRACTING PIN BONES FROM A FILLET

(75) Inventor: John Breiland, Klepp St. (NO)

(73) Assignee: Trio Food Processing Machinery AS, Stavanger (NO)

( * ) Notice: Subject to any disclaimer, the term of this patent is extended or adjusted under 35 U.S.C. 154(b) by 367 days.

(21) Appl. No.: 13/120,772

(22) PCT Filed: Sep. 25, 2009

(86) PCT No.: PCT/NO2009/000333
§ 371 (c)(1),
(2), (4) Date: Sep. 14, 2011

(87) PCT Pub. No.: WO2010/036125
PCT Pub. Date: Apr. 1, 2010

(65) Prior Publication Data
US 2011/0319003 A1    Dec. 29, 2011

(30) Foreign Application Priority Data
Sep. 26, 2008 (NO) .................................. 20084101

(51) Int. Cl.
*A22C 25/16* (2006.01)
(52) U.S. Cl.
CPC .................................. *A22C 25/166* (2013.01)
USPC ............................................................ 452/135
(58) Field of Classification Search
USPC ................. 452/135–136, 138–140, 160–162
See application file for complete search history.

(56) References Cited

U.S. PATENT DOCUMENTS

| 2,857,621 | A | * | 10/1958 | Schlichting | 452/136 |
| 3,319,287 | A | * | 5/1967 | Michael | 452/135 |
| 3,902,222 | A | | 9/1975 | Hartmann | |
| 3,955,242 | A | | 5/1976 | Hartmann | |
| 4,008,509 | A | * | 2/1977 | Braeger et al. | 452/135 |
| 4,037,294 | A | | 7/1977 | Cowie et al. | |
| 4,056,866 | A | | 11/1977 | Wenzel | |
| 4,151,629 | A | | 5/1979 | Braeger | |
| 4,771,511 | A | | 9/1988 | Weyand | |
| 4,920,612 | A | | 5/1990 | Moore | |
| 4,945,607 | A | | 8/1990 | Akesson et al. | |
| 5,163,865 | A | | 11/1992 | Smith | |

(Continued)

FOREIGN PATENT DOCUMENTS

| GB | 1461296 A | 1/1977 |
| JP | 406046743 A | 2/1994 |

(Continued)

OTHER PUBLICATIONS

English translation of NO 303762 (the original document was included in the Information Disclosure Statement filed Apr. 19, 2011).

(Continued)

*Primary Examiner* — David Parsley
(74) *Attorney, Agent, or Firm* — Andrus Intellectual Property Law, LLP

(57) ABSTRACT

Method for extracting pin bones from a fillet wherein the pin bones are extracted by a tool having a certain speed relative to the fillet and wherein the tool is displaced at different relative speeds along a first fillet portion where the fillet has pin bones and along a second fillet portion where the fillet has no pin bones.

13 Claims, 4 Drawing Sheets

(56) References Cited

U.S. PATENT DOCUMENTS

| | | | |
|---|---|---|---|
| 5,525,101 A * | 6/1996 | Soderlind | 452/135 |
| 5,830,052 A | 11/1998 | Wadsworth | |
| 5,911,621 A * | 6/1999 | Durst et al. | 452/135 |
| 5,947,808 A | 9/1999 | Adams | |
| 6,123,614 A | 9/2000 | Kozycki | |
| 6,406,366 B1 * | 6/2002 | Kozycki | 452/135 |
| 6,843,714 B2 * | 1/2005 | Jurs et al. | 452/161 |
| 6,935,941 B1 | 8/2005 | Muehlenbeck | |
| 7,153,203 B2 | 12/2006 | Pfarr et al. | |
| 7,850,511 B2 | 12/2010 | Voll et al. | |
| 2003/0109210 A1 * | 6/2003 | Jacobsen et al. | 452/138 |
| 2006/0096434 A1 | 5/2006 | Mosiewicz et al. | |
| 2006/0288833 A1 | 12/2006 | Lachance | |
| 2007/0123156 A1 * | 5/2007 | Shipman | 452/135 |
| 2007/0293132 A1 * | 12/2007 | Arnason | 452/140 |

FOREIGN PATENT DOCUMENTS

| | | |
|---|---|---|
| NO | 303762 B1 | 8/1998 |
| NO | 323327 B1 | 3/2007 |
| WO | 99/52375 A1 | 10/1999 |
| WO | 9952375 A1 | 10/1999 |
| WO | 01/84941 A1 | 11/2001 |
| WO | 2006/064521 A1 | 6/2006 |

OTHER PUBLICATIONS

"FTC QuatroMatic" Trio FTC Sweden AB, product catalog.

International Search Report for parent application PCT/NO2009/000333, having a mailing date of Dec. 11, 2009.

Written Opinion for parent application PCT/NO2009/000333, having a mailing date of Dec. 11, 2009.

Applicant's Response dated Jul. 19, 2010 to Written Opinion for parent application PCT/NO2009/000333, having a mailing date of Dec. 11, 2009.

Written Opinion for parent application PCT/NO2009/000333, having a mailing date of Nov. 23, 2010.

Preliminary Report on Patentability for parent application PCT/NO2009/000333, having a completion date of Dec. 20, 2010.

* cited by examiner

METHOD AND DEVICE FOR EXTRACTING PIN BONES FROM A FILLET

CROSS-REFERENCE TO RELATED APPLICATIONS

This application is the U.S. national stage application of International Application No. PCT/NO2009/000333, filed Sep. 25, 2009, which International application was published on Apr. 1, 2010 as International Publication No. WO 2010/036125 A1 in the English language and which application is incorporated herein by reference. The International application claims priority of Norwegian Patent Application No. 20084101, filed Sep. 26, 2008, which application is incorporated herein by reference.

BACKGROUND

This invention relates to a method for extracting pin bones from a fillet. More particularly it concerns a method for extracting pin bones from a fillet where the pin bones are extracted by a tool having a certain displacement speed relative to the fillet. The invention also comprises a device for performing the method.

From the dorsal vertebra of a fish extends, as is known, a vertically upward extending bone, and concerning the anterior dorsal vertebrae also at least two ribs encircling the abdominal cavity. In several kinds of fish, among them salmonids, are the anterior dorsal vertebrae also provided with two so-called dorsal ribs extending mainly horizontally out in different directions from the dorsal vertebra. The dorsal is ribs are often referred to as pin bones. The said directions are referred to the normal swimming position of the fish.

The pin bone comprises a relatively hard bone portion closest to the dorsal vertebra and a softer gristly portion comprising collagen fibres closer to its outer end portion. The outer end portion is provided with a relatively large number of threadlike soft tendons extending from the gristle portion and out into the fish flesh. These tendons connect the pin bone to the fish flesh in an efficient way.

When the pin bone during gutting of fresh fish is to be extracted from the fish flesh, the said relatively strong connection between the pin bone and the fish flesh causes that the pin bone may be torn in a position along its complete length, or that some of the fish flesh may come with the pin bone out of the fish. If fish flesh comes out with the pin bone, this means loss of fish flesh yield, an opening in the fillet and damage to the fish flesh.

To overcome this problem it is common according to prior art to slice the fish flesh possibly V-shaped along the pin bones to be able to remove them, or to wait until after the death stiffness has gone out of the flesh and then extract them.

Experience shows that the speed at which the pin bone is extracted from the fish flesh is of great importance to achieve is a successful removal of the pin bones. At too speedy extraction the pin bones are torn or pull with them fish flesh while they at a relatively slow pulling speed let go the fish flesh and may be removed in an expedient manner.

Localization of pin bones and the extraction operation itself may be carried out by methods and devices known to a person well versed in the art and are therefore not described further.

Due to the relatively slow speed at which the pin bones may be extracted it is often necessary to spread fish fillets from a production line between two or more pin bone extractors to be able to utilise the capacity of the production line. Such spreading complicates matters and leads thereby to additional costs.

SUMMARY

The object of the invention is to remedy or reduce at least one of prior art drawbacks.

The object is achieved according to the invention by the features stated in the below description and in the following claims.

There is provided a method to extract pin bones from a fillet wherein the pin bones are extracted by means of a tool having a certain displacement speed relative to the fillet. The method is characterised in that the tool is displaced with relatively different speeds along a first fillet portion wherein the fillet has pin bones and along a second fillet portion wherein the fillet has no pin bones.

By so doing the tool may be displaced relatively slowly relative to the fillet while the pin bones are being extracted, where after the tool is displaced relatively fast forward to a following fillet.

The term different speeds may also include different directions.

The fillets are often positioned on a transport arrangement displacing the fillets at a constant speed. During extraction of pin bones the tool may for example be displaced in the same direction as the displacement direction of the transport arrangement. Subsequently the tool is displaced quickly to its starting position in time for treatment of the next fillet. In such a method the tool is displaced at different speeds during different phases of the operation.

In an alternative method the fillet may be displaced at different speeds during different phases of the operation.

The tool may be displaced at relatively low relative speed in a first direction over the first fillet portion and at a relatively great relative speed in the opposite direction over the second fillet portion.

The above-mentioned method is suitable for use when the fillet is displaced in the same direction as the pin bone extraction direction. If the fillet is displaced in the opposite direction to the extraction direction, the tool has to be displaced at a greater speed than the fillet speed during extraction of the pin bones.

The method may be performed by means of a pin bone extractor device for extracting of pin bones from a fish fillet wherein the pin bone extractor comprises a tool arranged to have a certain speed relative to the fillet. The device is characterised in that the tool is connected to a hanger or a guide, as the relative speed of the tool relative to the fillet is adjustable.

The hanger may be attached to a transport drum for fillets or the guide may be attached to a conveyor for fillets.

The tool may abut the fillet during extraction of the pin bones from a first fillet portion and be clear of the fillet when the tool is positioned over a second fillet portion, as the tool distance from the transport drum or the conveyor is adjustable.

The tool displacement speed may be controlled by the control system of the pin bone extractor by means of an actuator.

The actuator displaces the tool at the desired speed along the transport arrangement. The manner of operation of the pin bone extractor is described in the specific part of the application.

A device and method according to the invention makes extraction of pin bones at a relatively slow speed possible at the same time as the downtime of the pin bone extractor is reduced considerably. This improvement in the utilisation of the pin bone extractor causes a considerable simplification in a production line for fish fillets.

BRIEF DESCRIPTION OF THE DRAWINGS

In the following is described an example of a preferred method and embodiment illustrated in the accompanying drawings wherein.

DETAILED DESCRIPTION OF THE DRAWINGS

Figure 1:
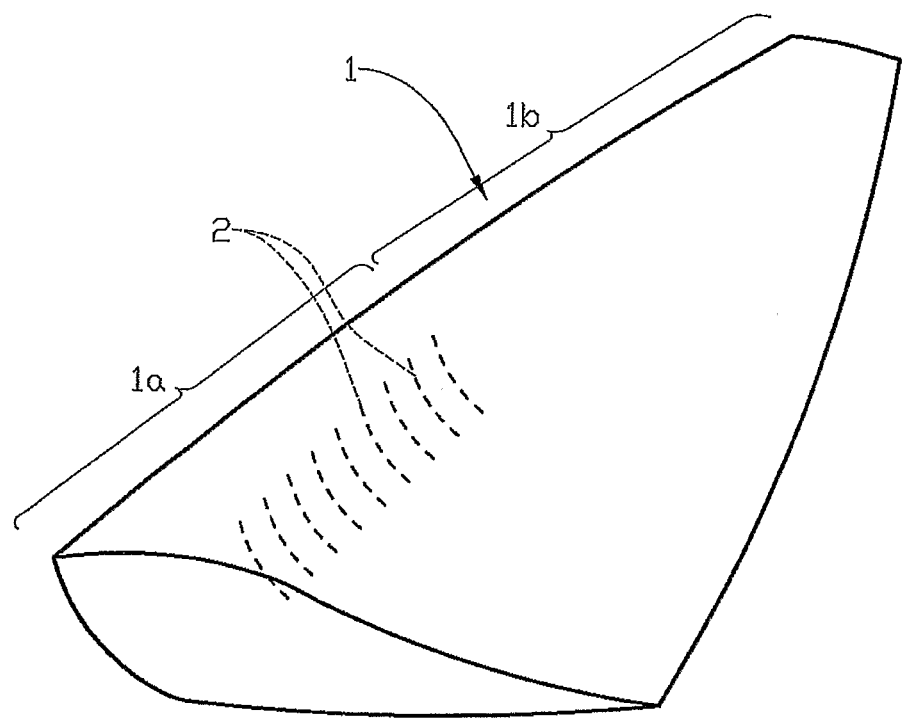
FIG. 1 shows schematically and in perspective a fish fillet before pin bones present in the fillet are extracted.

In the drawings the reference numeral 1 indicates a fillet from a fish, such as a salmon, comprising pin bones 2. The pin bones 2 are positioned in a first portion 1a of the fillet 1, while a second portion 1b is devoid of pin bones.

Figure 2:
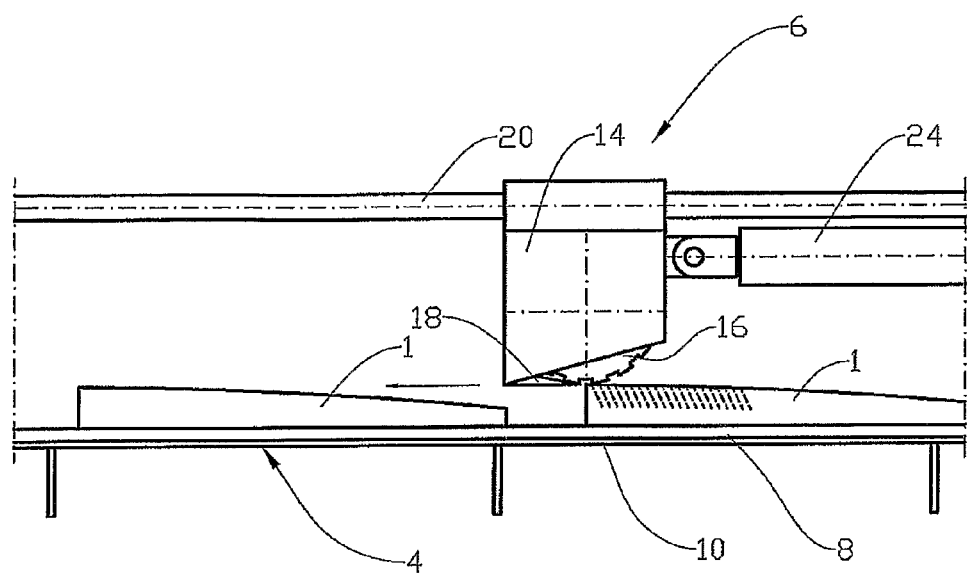
FIG. 2 shows schematically in side view a device comprising a tool for extracting pin bones.

Fillets 1 are placed following each other on a transport arrangement 4 in a pin bone extractor 6, which in the example according to FIG. 2 is constituted by a conveyor 8 being displaced at approximately constant speed on a bed 10.

Figure 3:
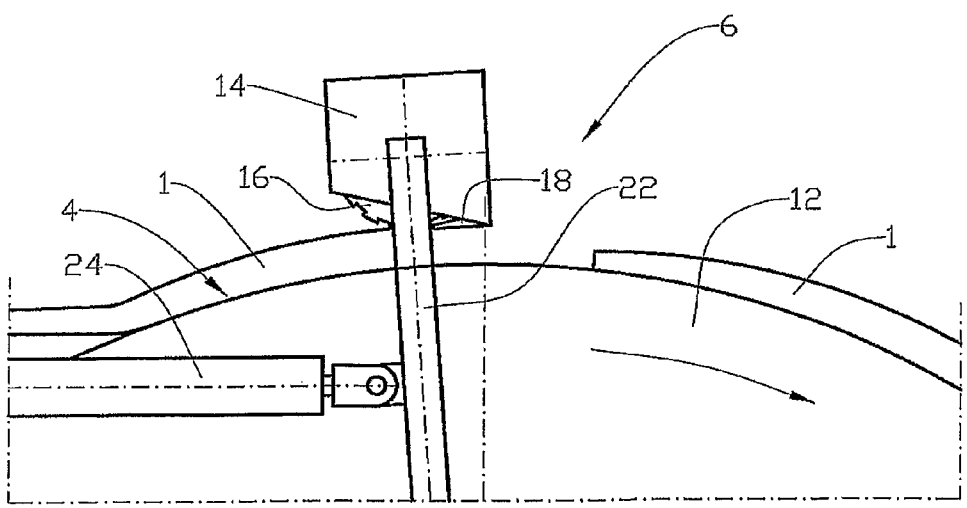
FIG. 3 shows schematically in side view an alternative embodiment of a device comprising a tool for extracting pin bones.

In the example of FIG. 3 the transport arrangement 4 is constituted by a transport drum 12.

A tool 14 of a per se known design for extracting pin bones 2 is placed over the fillets 1. A so-called "Ergo-Light" from TRIO FTC, Stockholm, may for example constitute the tool 14. The tool 14 comprising a driven raster drum 16 and a holding tool 18, is displaceable along a guide 20, respectively rotatably in a hanger 22 by means of an actuator 24 connected directly or indirectly to the tool 14.

The distance of the tool 14 from the fillet is adjustable. The tool 14 is thereby arranged to be able to abut the fillet 1 when the tool 14 is in its active position 1 while the pin bones 2 are extracted, and to be able to be positioned at a distance from the fillet 1 when the tool 14 is in its passive position.

The displacement speed of the actuator 24 and thereby the displacement speed of the tool 14 relative to the relevant fillet 1 is adjusted by the not shown control system of the pin bone extractor 6.

Figure 4:
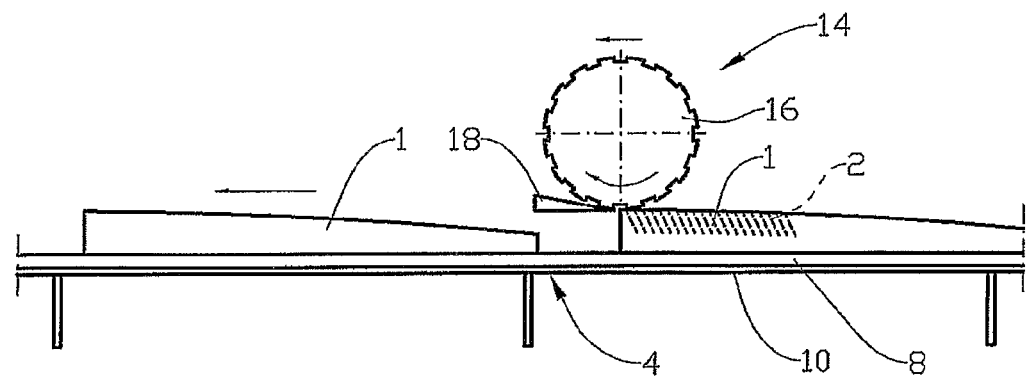
FIG. 4 shows a principle sketch of the tool in a starting position.

In FIG. 4 the tool 14, whereof only the raster wheel 16 and the holding tool 18 are shown in the FIGS. 4 to 7, is placed in its starting position. The raster wheel 14 is turned clockwise, see arrow, as the fillets 1 are displaced by the transport arrangement 4 at a first speed. The tool 14 is displaced at a lesser speed, for example half speed, in the same direction as the displacement direction of the fillets 1.

The relative speed between the fillets 1 and the tool 14 is thus less than if the tool 14 was stationary. When the raster wheel 16 grips a pin bone 2 and pulls the pin bone 2 up over the holding tool 18, may the work thus take place at a lower extraction speed giving a considerably improved functional certainty.

Figure 5:
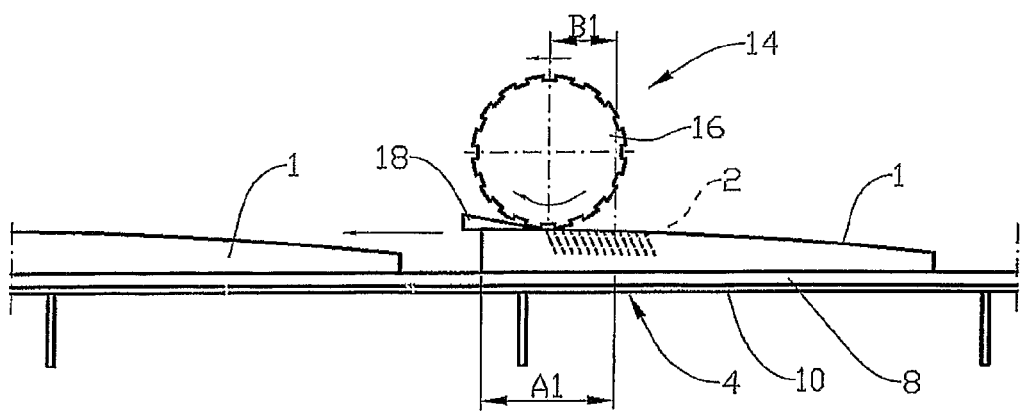
FIG. 5 shows a principle sketch of the tool in an intermediate position.

In FIG. 5 the fillets 1 are disposed relative to the starting position in FIG. 4 a distance A1 while the tool 14 is displaced a shorter distance B1. The tool 14 has removed the pin bone 2 from that part of the fillet 1 past which it has been displaced.

Figure 6:
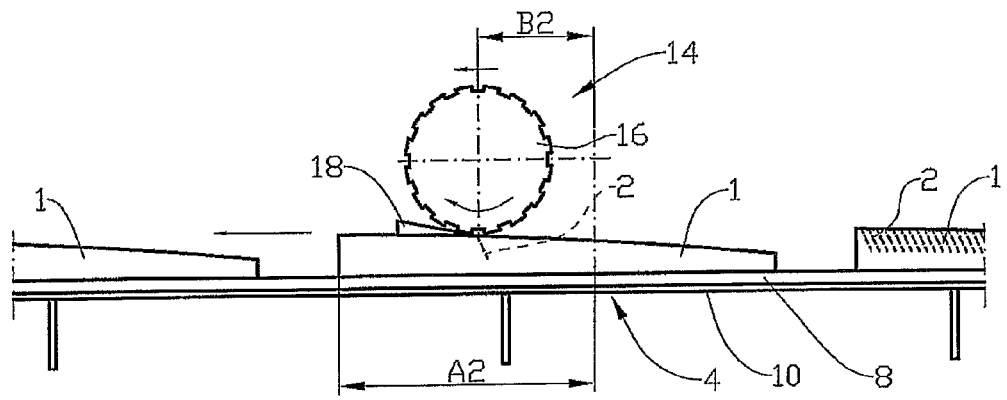
FIG. 6 shows a principle sketch of the tool in an end position.

In FIG. 6, where extraction of the pin bone from the relevant fillet 1 is nearly complete, the fillet 1 is displaced a distance A2 while the tool 14 is displaced a distance B2.

Figure 7:
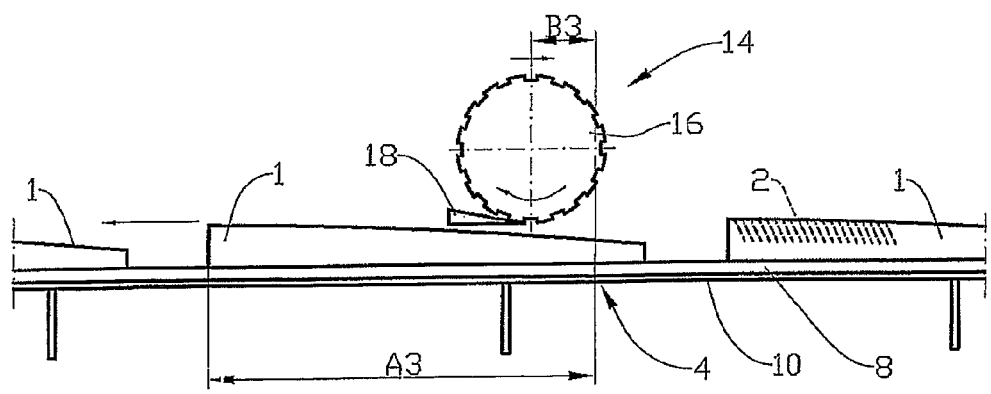
FIG. 7 shows a principle sketch of the tool in a return position.

In FIG. 7 the tool 14 is displaced in the opposite direction to the fillet 1 as the tool 14 is on its way back to its starting position ready for the next fillet 1 and corresponding to the position shown in FIG. 4. The tool 14 is in this position at a distance from the fillet. The fillet 1 which has been treated is at a distance A3 from its starting position while the tool 14 is at a distance B3 from its starting position, as the distance B3 is less than the distance B2.

The tool 14 is displaced at a lesser relative speed over the first fillet portion 1a than over the second fillet portion 1b.

The invention claimed is:

1. A method of extracting pin bones from a fish fillet, the fillet having a first portion with pin bones and a second portion without pin bones, the method comprising:

transporting the fillet on transport arrangement at a first displacement speed;

moving an extraction tool at a second displacement speed that is different than the first displacement speed while extracting the pin bones by gripping and then pulling the pin bones from the first portion of the fillet, the extraction tool being coupled to at least one of a guide and hanger; and thereafter moving the tool with respect to the second portion of the fillet at a third displacement speed that is different from the second displacement speed;

wherein the fillet is transported on the transport arrangement in a first direction at the first displacement speed and wherein the extraction tool is moved with respect to the first portion of the fillet in the first direction at the second displacement speed, wherein the second displacement speed is less than the first displacement speed.

2. A method according to claim 1, wherein the tool is moved with respect to the second portion of the fillet in a second, opposite direction at the third displacement speed.

3. A method according to claim 2, comprising subsequently moving the extraction tool in the first direction at the second displacement speed while extracting pin bones from a first portion of a following fillet.

4. A method according to claim 3, comprising subsequently moving the extraction tool with respect to a second portion of the following fillet in the second, opposite direction at the third displacement speed.

5. A pin bone extractor device for extracting pin bones from a fish fillet having a first portion with pin bones and a second portion without pin bones, the device comprising:

a transport arrangement transporting the fillet at a first displacement speed;

an extraction tool extracting the pin bones by gripping and pulling the pin bones from the fillet, the extraction tool being coupled to at least one of a guide and hanger;

a control device that controls the transport arrangement to transport the fillet at a first displacement speed, controls the extraction tool to move parallel to the transport arrangement and with respect to the first portion of the fillet at a second displacement speed that is different than the first displacement speed while extracting the pin bones from the fillet without cutting the pin bones, and thereafter controls the tool to move parallel to the transport arrangement and with respect to the second portion of the fillet at a third displacement speed that is different from the second displacement speed.

6. A device according to claim 5, wherein the fillet is transported on the transport arrangement in a first direction at the first displacement speed and wherein the extraction tool is moved with respect to the first portion of the fillet in the first direction at the second displacement speed.

7. A device according to claim 6, wherein the tool is moved with respect to the second portion of the fillet in a second, opposite direction at the third displacement speed.

8. A device according to claim 5, comprising the hanger, wherein the hanger is coupled to a transport drum for fillets.

9. A device according to claim 5, wherein the transport arrangement comprises a conveyor.

10. A device according to claim 9, comprising the guide, wherein the guide is coupled to the conveyor.

11. A device according to claim 5, comprising an actuator changing displacement speed of the tool.

12. A device according to claim 5, wherein the tool abuts the fillet during extraction of the pin bones from the first fillet portion and wherein the tool is separated from the fillet by a clearance distance when the tool is moved with respect to the second portion of the fillet.

13. A pin bone extractor device for extracting pin bones from a fish fillet having a first portion with pin bones and a second portion without pin bones, the device comprising:
   a transport arrangement transporting the fillet at a first displacement speed;
   an extraction tool extracting the pin bones by gripping and pulling the pin bones from the fillet, the extraction tool being coupled to at least one of a guide and hanger;
   a control device that controls the transport arrangement to transport the fillet at a first displacement speed, controls the extraction tool to move parallel to the transport arrangement with respect to the first portion of the fillet at a second displacement speed that is less than the first displacement speed while extracting the pin bones from the fillet, and thereafter controls the tool to move parallel to the transport arrangement with respect to the second portion of the fillet at a third displacement speed that is greater than the second displacement speed;
   wherein the fillet is transported on the transport arrangement in a first direction at the first displacement speed and wherein the extraction tool is moved with respect to the first portion of the fillet in the first direction at the second displacement speed;
   wherein the tool is moved with respect to the second portion of the fillet in a second, opposite direction at the third displacement speed; and
   wherein the tool abuts the fillet during extraction of the pin bones from the first fillet portion and wherein the tool is separated from the fillet by a clearance distance when the tool is moved with respect to the second portion of the fillet.

* * * * *